H. ROCKWELL.
Cane-Stripper.
No. 51,482.
Patented Dec. 12, 1865.
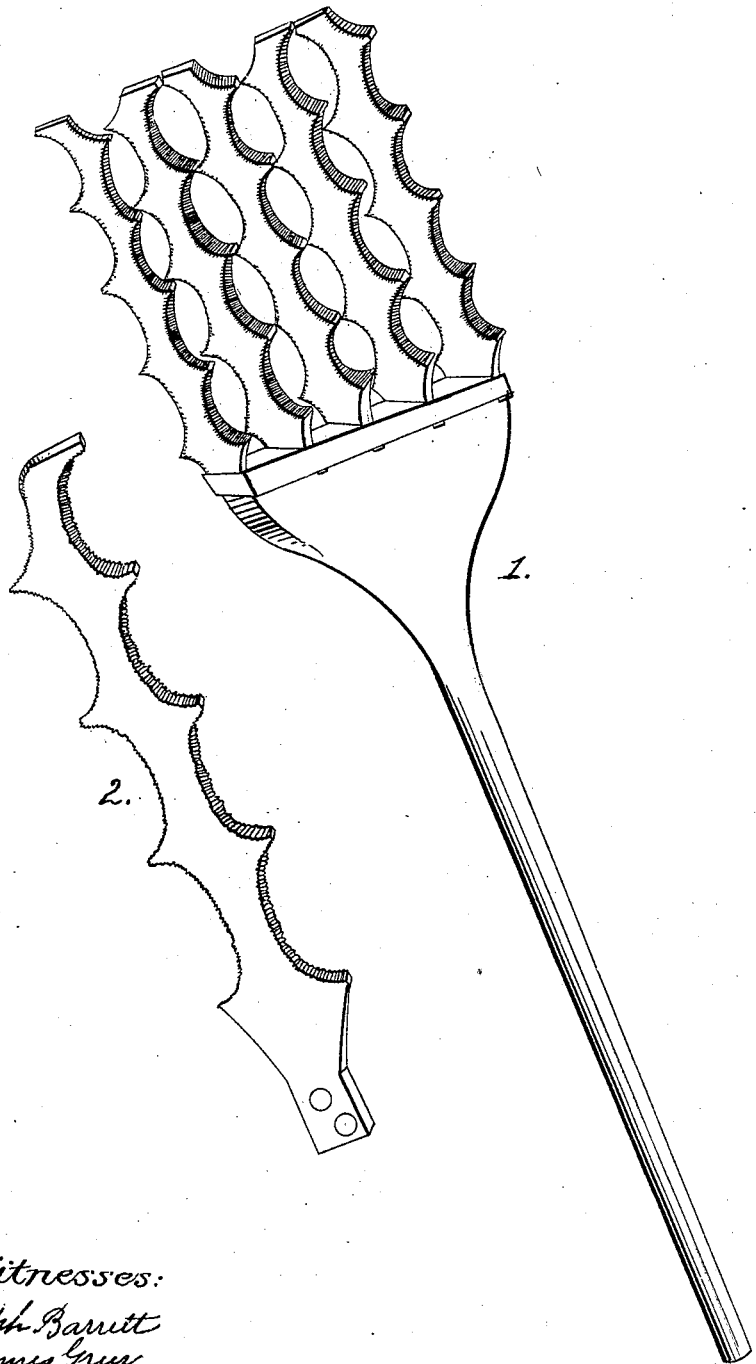
Witnesses:
Joseph Barritt
James Grier
Inventor:
Horace Rockwell

UNITED STATES PATENT OFFICE.

HORACE ROCKWELL, OF ROANOKE, INDIANA.

IMPROVEMENT IN CANE-STRIPPERS.

Specification forming part of Letters Patent No. 51,482, dated December 12, 1865.

*To all whom it may concern:*

Be it known that I, HORACE ROCKWELL, of Roanoke, in the county of Huntington, in the State of Indiana, have invented an Instrument for the Use and Purpose of Stripping the Blades from Sorghum or other Sugar-Canes, of which the following, with reference to the accompanying drawings, is a true description.

The instrument, which I call my "sugar-cane comb," is composed of several (say five, more or less) metallic blades or prongs fixed in a wooden handle of convenient length—say four or five feet—with a head of sufficient width to hold them at about two inches apart from each other, fixed with the flattened sides to each other and the edges reversed, so that every other one shall turn its end curve up and the other down. (See drawing No. 1.) I make the blades of steel, which I think best, (though they might be made of cast or wrought iron,) about fourteen inches in length and one-eighth of an inch in thickness and one and three-fourths inch in the whole width, including curves. For the exact form of the blades and the curves as made in both edges of the blades, see drawing No. 2. The edges should be squared to the sides and rough-hacked, so as to render the angles somewhat serrated. (See drawings.)

The number of curves in a blade, or number of blades in a handle may be varied to suit purchasers.

In operating, the comb is thrust among the stalks of cane, near the top, getting as many stalks within the prongs as grow near enough together for the purpose, giving the handle a quick turn to the right or left so as to cramp the canes into the curves of the blades, bringing the comb with force down the whole length of the canes to the ground, taking off all the leaves in its course. A little additional scraping will take off all the shucks or wrappers from the stalks, leaving them clean and smooth.

I claim—

The instrument, as and for the purpose described.

HORACE ROCKWELL.

Attest:
 I. SNAIDNER,
 D. N. GRIMM.